Aug. 11, 1942.   H. L. HAINES ET AL   2,292,688
CHAIN SPROCKET ACCESSORY
Filed March 10, 1941

Inventors
HAROLD L. HAINES, AND
ALFORD C. BARROWS
By Beaman & Langford
Attorneys Patented Aug. 11, 1942

2,292,688

UNITED STATES PATENT OFFICE 2,292,688

CHAIN SPROCKET ACCESSORY

Harold L. Haines and Alford C. Barrows, Ann Arbor, Mich., assignors to Economy Baler Company, Ann Arbor, Mich., a corporation of Michigan Application March 10, 1941, Serial No. 382,570

4 Claims. (Cl. 74—230)

The present invention relates to a chain sprocket accessory and more particularly to a structure for insuring a driving engagement between a chain and its sprocket, notwithstanding the accumulation of foreign material on the sprocket.

Chain sprockets on certain machines, such as baling presses, for instance, accumulate foreign material which builds up on the periphery of the sprocket until the chain under operating stress slips on the sprocket. Paper is one example of such foreign material. According to the present invention a guiding or camming construction is arranged close to the periphery of a sprocket in order to force the chain into relative driving relation with the sprocket and at the same time a cleaning finger is employed adjacent a portion of the periphery of the sprocket not in relative driving relation with the chain for stripping from the sprocket such foreign material as may be compressed thereon by the chain.

An object of the invention is to provide a guiding structure for forcing a chain into relative driving relation with a chain sprocket notwithstanding the accumulation of a deposit of foreign material on the sprocket.

Another object of the invention is to provide in association with a chain sprocket having a chain running thereover in relative driving relation, a sprocket cleaning member disposed in contiguous relation with a portion of the sprocket not in relative driving relation with the chain, whereby as the sprocket rotates foreign material on the sprocket is stripped therefrom.

Figure 1:
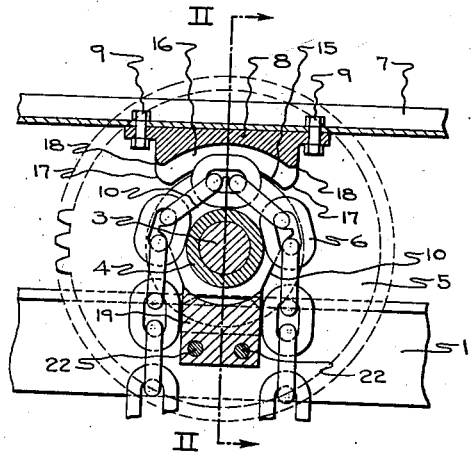
Figure 3:
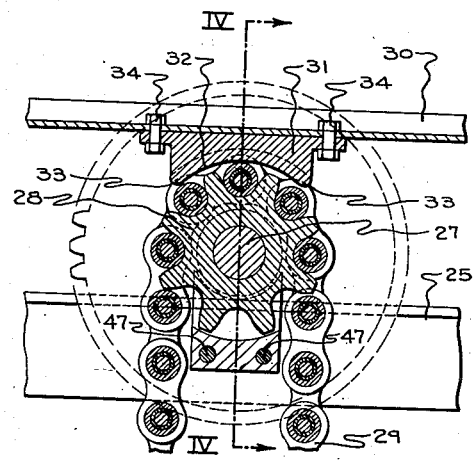
Figure 2:
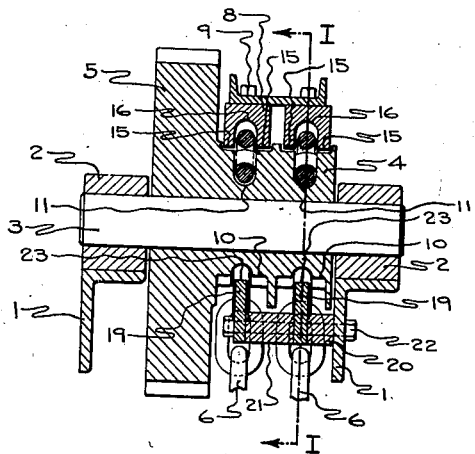
Figure 4:
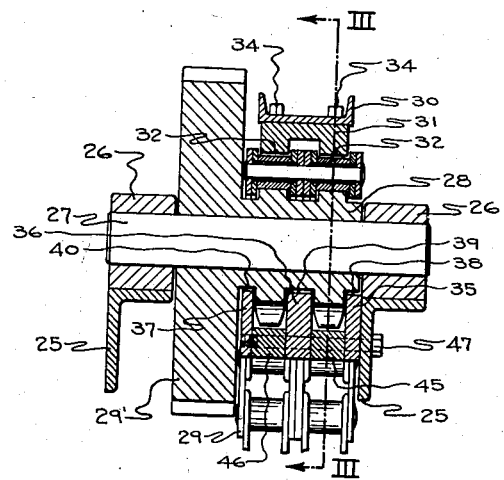

These and other objects residing in the arrangement, combination and construction of the parts will be apparent from the following specification when taken with the accompanying drawing in which Fig. 1 is a section on the line I—I of Fig. 2, disclosing the invention as applied to a crane chain sprocket having a crane chain running thereover in relative driving relation, Fig. 2 is a section on the line II—II of Fig. 1, Fig. 3 is a section on the line III—III of Fig. 4, showing the invention as applied to a toothed chain sprocket having running thereover in relative driving relation a roller chain, and Fig. 4 is a section on the line IV—IV of Fig. 3.

Referring particularly to the drawing, the reference character 1 indicates parts of a frame of a machine which in the present instance is a baling press, the parts 1 having supported thereon bearings 2. Rotatably mounted in the bearings 2 is a shaft 3 carrying a chain sprocket 4. The sprocket 4 as shown is dual in nature in that it provides for two lengths 6 of chain running thereover, as shown particularly in Fig. 2. The sprocket 4 is driven by a gear 5, which may be integral with the sprocket 4 as shown, or may be separate therefrom. The gear 5 is driven from some suitable source of power, such as an electric motor, not shown.

Adjacent with the sprocket 4 is frame portion 7, to which are secured chain guides 8 by some suitable means, as by bolts 9. The chain lengths 6 passing over the sprocket 4 are of the crane type and for receiving the chain 6 links lying parallel to the axis of the sprocket 4, the sprocket 4 is provided with recessed seats 10. For receiving the links of the chain 6 which are normal to the axis of the sprocket 4, the sprocket 4 is provided with circumferentially extending grooves 11. The configuration of the sprocket 4 is conventional.

Each chain guide 8 is provided with shoulder portions 15, which are arcuate in shape, are concentric with the sprocket 4, and are slightly spaced from the periphery of the sprocket 4, as shown particularly in Fig. 1. The shoulders 15 act on the chain links which lie parallel to the axis of the sprocket 4. The chain guides 8 are also provided with arcuate grooves 16 for receiving and acting on the chain links which are disposed normal to the axis of the sprocket 4. As shown particularly in Fig. 1 each end of the shoulders 15 is provided with a curved camming surface 17 and each end of the bottoms of the channels 16 is provided with a curved camming surface 18.

In the operation of the machine with which the chain lengths 6 and the sprocket 4 are associated, should loose or other foreign material such as paper or the like become disposed between the chain lengths 6 and the sprocket 4 and tend to urge the chain lengths 6 out of relative driving relation with the sprocket 4, the links of the chain lengths 6 will be cammed by the camming surfaces 17 and 18 into position between the chain guides 8 and the sprocket 4. The chain guides 8 are so spaced and arranged with respect to the sprocket 4 that when there is a predetermined amount of foreign material in the sprocket 4 it positively forces the chain lengths 6 into relative driving relation with the sprocket 4, compressing foreign material on the sprocket 4 or squeezing it laterally therefrom. However, if there is no foreign material on the sprocket 4, the guides 8 are inactive.

It will be understood that after a period of operation, there is likely to be so much foreign material built up on the sprocket 4 that the chain may wedge between the sprocket 4 and one or both of the chain guides 8. In order to eliminate this possibility, there are provided cleaning members 19, which as shown in Figs. 1 and 2, project into the grooves 16. The cleaning members 19 are relatively fixed with respect to the sprocket 4 and are supported from one of the frame members 1, as shown particularly in Fig. 2. While any suitable means may be employed for supporting the cleaning members 19 in fixed relation relative to the sprocket 4, the structure shown comprises a spacing member 20, disposed between a frame member 1 and one of the cleaning members 19, and another spacing member 21 spaced between the named cleaning member 19 and the other cleaning member 19, with the cleaning members 19, the spacing members 20 and 21, and the frame member 1, clamped together as a unit by bolts 22.

The cleaning members 19 in the form disclosed are in the form of flat plates having end surfaces 23 arcuate in configuration and concentric with the bottom of the groove 11, as shown particularly in Fig. 1. As the sprocket 4 rotates the cleaning members 19 act to strip foreign material compressed on the sprocket 4 from the sprocket 4 so as to insure an operative relative driving relation between the sprocket 4 and the chain lengths 6.

While it is preferred that both the guides 8 and the cleaning members 19 be used together, it will be appreciated that each of these accessories may be used separately if desired. Furthermore, it will be understood that the invention may be associated with the sprockets arranged to receive less or more than two chain lengths 6 side by side.

Another form of the invention is disclosed in Figs. 3 and 4, wherein frame members 25 support bearings 26 in which is rotatably supported a shaft 27. Mounted on the shaft 27 is a toothed sprocket 28 arranged for relative driving engagement with a roller chain 29. As shown, the sprocket 28 is arranged with two sets of teeth for engagement with a double roller chain. It will be understood that the roller chain may be of single width or more than double width as desired and that the toothed sprocket 28 may be designed accordingly. The sprocket 28 is driven by a gear 29' shown integral with the sprocket 28. However, it will be understood that the sprocket 28 and the gear 29' may be separate, should such an arrangement be desired.

To a frame member 30 is supported a chain guiding member 31, similar in function to the chain guiding members 8 disclosed in Figs. 1 and 2. The chain guiding member 31 is provided with shoulders 32 which provide surfaces arcuate in configuration and concentric with the periphery of the sprocket 28, slightly spaced from the periphery of the sprocket 28 for bearing against the rollers of the roller chain 29. At each end of the shoulders 32 are provided curved camming surfaces 33, similar to the camming surfaces 17 and 18 disclosed in Fig. 1. Thus, as the sprocket 28 rotates carrying with it in relative driving relation the chain 29, the camming surfaces 33 at one end of the shoulders 32, will cam the chain 29 between the sprocket 28 and the shoulders 32 and thus into relative driving engagement with the sprocket 28, should any foreign material on the sprocket 28 tend to urge the chain 29 out of relative driving relation with the sprocket 28. As in the case of the guides 8, the guide 31 is arranged to be inactive if there is no foreign material on its sprocket 28. The chain guide 31 may be secured to the frame member 30 in any suitable manner as by bolts 34.

Associated with the sprocket 28 are sprocket cleaning members 35, 36 and 37. The cleaning members 35, 36 and 37 are provided with arcuate surfaces 38, 39 and 40, respectively, which are concentric with the peripheral portions of the sprocket 28 at the base of the sprocket teeth. The cleaning members 35 and 37 are disposed on the outer sides of the teeth and the cleaning member 36 is disposed between the teeth. In the form of the invention shown, the cleaning members 35, 36 and 37 are in the form of plates. The cleaning member 35 is disposed against a frame member 25. A block 45 separates the cleaning members 35 and 36 and a block 46 separates the cleaning members 36 and 37. The cleaning members 35, 36 and 37 and the spacing blocks 45 and 46 are clamped in assembled relation to a frame member 25 by bolts 47, thus, rigidly supporting the supporting cleaning members 35, 36 and 37 in fixed relation to the sprocket 28. Thus, as the sprocket 28 rotates any foreign material that may have become packed between the teeth or at the sides of the teeth of the sprocket is stripped therefrom to permit relative driving engagement between the sprocket 28 and the chain 29 and also to prevent foreign material on the sprocket 28 from causing the chain 29 to wedge between the sprocket 28 and the chain guide 31. As in the form of the invention disclosed in Figs. 1 and 2, the chain guide and cleaning members may be used together or separately as desired.

The cleaning members of the form of the invention disclosed in Figs. 1 and 2 and in Figs. 3 and 4 provide, as the result of the intersection of their arcuate surfaces, concentric with the respective sprockets, with the side surfaces thereof, wedge shaped operative corners which facilitate the stripping of foreign material from their respective sprockets. However, it is to be understood that the invention is not limited to any particular shape of cleaning member and that other cleaning members than the specific one disclosed may be employed. Furthermore, the cleaning members as well as the guiding members may be supported in any suitable fashion other than as shown. Also, while the driving gears 5 and 29' have been disclosed in association with the sprockets 4 and 28, respectively, it is to be understood that this association is not a part of the invention, but that some other drive independent of the sprocket may be provided.

While the cleaning members in both forms of the invention are primarily for the purpose of cleaning accumulated foreign material from the sprockets, it will be apparent from inspection of Figs. 1 and 3 particularly, that the cleaning members also serve to cover the portion of the periphery of their respective sprockets which are not contiguous with the chains. This covering action serves to make more difficult the entrance of foreign material, such as paper or the like, between the sprockets and the chains.

Another advantage of the present invention is in the action of the chain guides, independently of the presence of foreign material. In using a chain passing over a sheave, it is common to employ an endless chain passing over two chain sheaves, one of them being driven to move the chain and the other one serving to tension the chain to hold it on the driven sheave. The present invention by insuring that a chain operatively engages with its sheave makes it possible to merely pass a chain over a driven sheave, one end of the chain being fastened to the member being actuated, the other end thereof hanging freely, without any danger of the chain jumping from its sheave, and thus eliminating one sheave and reducing the length of chain required.

Having thus described our invention, what we desire to secure and claim by Letters Patent is:

1. In combination with a chain sprocket and a rotatable chain passing thereover in operative relation, a chain guide disposed close to the periphery of said sprocket for maintaining said chain and sprocket in operating relation, whereby when foreign material between said chain and sprocket tends to urge said chain out of operative relation with said sprocket, said guide urges said chain into operative relation with said sprocket and at least a part of said foreign material is compressed on said sprocket, and relatively fixed cleaning means disposed in contiguity with that portion of the periphery of said sprocket which is not in contact with said chain for engaging foreign matter on said sprocket and removing it therefrom as said sprocket rotates, said cleaning means having portions adjacent the portion of said chain about to contact said sprocket and the portion leaving said sprocket.

2. In combination with a rotatable chain sprocket and a chain passing thereover in operative relation, said chain being in operative contact with a portion only of said sprocket, a chain guide disposed close to the periphery of said sprocket for maintaining said chain and sprocket in operative relation, whereby when foreign material between said chain and sprocket tends to urge said chain out of operative relation with said sprocket, said guide urges said chain into operative relation with said sprocket and at least a part of said foreign material is compressed on said sprocket, and a cleaning finger projecting into contiguity with that portion of the periphery of said sprocket which is not in contact with said chain for stripping foreign matter on said sprocket therefrom as said sprocket rotates, said cleaning finger having portions adjacent the portion of said chain about to contact said sprocket and the portion leaving said sprocket.

3. The invention as defined in claim 2 wherein both said chain guide and cleaning finger have portions thereof which are in concentric relation to the periphery of said sprocket.

4. In combination with a rotatable chain sprocket and a chain passing thereover, said chain being in operative contact with a portion only of said sprocket, means disposed adjacent that portion of the periphery of said sprocket which is not in contact with said chain, said means also having portions adjacent the portion of said chain about to contact said sprocket and the portion leaving said sprocket, said means serving to shield said sprocket and to prevent foreign material accidentally scattered in the vicinity of the chain and sprocket from entering between said chain and sprocket.

HAROLD L. HAINES.
ALFORD C. BARROWS.